US009421929B2

(12) United States Patent
Yoon

(10) Patent No.: US 9,421,929 B2
(45) Date of Patent: Aug. 23, 2016

(54) AIRBAG DEPLOYMENT CONTROL APPARATUS AND METHOD

(71) Applicant: Joseph Y. Yoon, Oakland Township, MI (US)

(72) Inventor: Joseph Y. Yoon, Oakland Township, MI (US)

( * ) Notice: Subject to any disclaimer, the term of this patent is extended or adjusted under 35 U.S.C. 154(b) by 0 days.

(21) Appl. No.: 14/621,530

(22) Filed: Feb. 13, 2015

(65) Prior Publication Data

US 2016/0082912 A1   Mar. 24, 2016

Related U.S. Application Data

(60) Provisional application No. 62/052,815, filed on Sep. 19, 2014.

(51) Int. Cl.
| | |
|---|---|
| *B60R 21/01* | (2006.01) |
| *G01S 17/88* | (2006.01) |
| *G01S 13/88* | (2006.01) |
| *G01S 17/93* | (2006.01) |
| *G01S 13/86* | (2006.01) |
| *G01S 13/93* | (2006.01) |

(52) U.S. Cl.
CPC .............. *B60R 21/01* (2013.01); *G01S 13/86* (2013.01); *G01S 13/931* (2013.01); *G01S 17/936* (2013.01); *B60R 2021/01013* (2013.01); *B60R 2021/01027* (2013.01); *G01S 2013/9367* (2013.01); *G01S 2013/9375* (2013.01); *G01S 2013/9378* (2013.01); *G01S 2013/9385* (2013.01)

(58) Field of Classification Search
None
See application file for complete search history.

(56) References Cited

U.S. PATENT DOCUMENTS

| | | | |
|---|---|---|---|
| 6,290,255 B1 * | 9/2001 | Stanley | ............. B60R 21/01536 180/271 |
| 7,284,769 B2 | 10/2007 | Breed | |
| 7,905,515 B2 | 3/2011 | Heurlin et al. | |
| 8,095,275 B2 | 1/2012 | Foo et al. | |
| 2003/0120408 A1 * | 6/2003 | Caruso | ................ B60R 21/0132 701/45 |
| 2004/0024509 A1 * | 2/2004 | Salib | .................. B60G 17/0162 701/45 |
| 2006/0226640 A1 | 10/2006 | Prakah-Asante et al. | |
| 2009/0299633 A1 | 12/2009 | Hawes et al. | |
| 2014/0358379 A1 | 12/2014 | Nakazawa | |

* cited by examiner

*Primary Examiner* — Mussa A Shaawat
*Assistant Examiner* — Kyung Kim
(74) *Attorney, Agent, or Firm* — Yound Basile Hanlon & MacFarlane, P.C.

(57) ABSTRACT

An airbag deployment control apparatus and method utilizes an output of a pre-collision sensor mounted on the vehicle as a first airbag safing signal, and an output of a vehicle mounted impact sensor, when the impact sensor output exceeds a predetermined level corresponding to an actual vehicle collision, as a second airbag safing signal. A control, after determining the occurrence of the two consecutive safing signals, checks airbag arming and deployment criteria for deployment of the airbag. The pre-impact sensor can be a camera, radar, or Lidar sensor mounted on the vehicle.

17 Claims, 5 Drawing Sheets

AIRBAG DEPLOYMENT CONTROL APPARATUS AND METHOD

CROSS REFERENCE TO CO-PENDING APPLICATION

This application claims priority benefit to the Sep. 19, 2014 filing date of U.S. provisional patent application, Ser. No. 62/052,815, filed in the name of Joseph Y. Yoon, and entitled Airbag Deployment Control Apparatus, the contents of which are incorporated herein in its entirety.

BACKGROUND

The present apparatus and method relate to airbag deployment control systems.

Many vehicles these days are equipped with new active safety system technologies, such as autonomous emergency braking (AEB) by the vehicle based on radar and/or camera and/or Lidar based sensing systems. This type of active safing system is to help mitigate occupant injuries by either avoiding crashes or by reducing the crash speed. However, this AEB can result in an unintended situation where it causes the occupant to be out of position and close to the airbag when the vehicle brakes itself. This can result in increased injuries for the occupant from the out of position (OOP) if the airbag deployment control logic does not take this into consideration.

In order to avoid this unintended situation from happening, overall deployment control logic for the occupant restraint systems is getting more complicated. Finding the most optimized airbag deployment time is critical to provide the maximum protection to the occupant in the accident. Unfortunately, most vehicles even equipped with current active safety systems, still have airbag systems that deploy airbags based on traditional crash sensing parameters. Generally, a traditional crash sensing system must meet safing, and deployment arming requirements before commanding airbag deployment. This is to ensure that airbag is not deployed by accident in a situation where airbag deployment is not warranted and airbag deployment is reserved only as a last resort to provide protection for the occupants.

Typically, earlier airbag deployment is better. However, the capability for fast deployment is often limited by the timing required to satisfy safing and arming criteria. Typically, in order to meet the safing requirement, the sensing system requires a minimum of two consecutive crash signals above a pre-determined deceleration threshold from a safing sensor. As the safing sensor runs at a certain frequency, this will affect overall airbag firing time. For example, for a safing sensor running at 100 Hz, the earliest firing of the airbag system will be a minimum of 10 msec.

FIG. 1 shows prior art safing logic for a traditional passive airbag system.

When a crash occurs as the vehicle is moving, the vehicle deceleration is typically detected as a series of signals at the safing sensor frequency. If the deceleration at any sample period is less than a predetermined deceleration threshold, nothing happens. However, when both the first signal $A_n$ and a second signal $A_{n+1}$ are greater than the predetermined deceleration threshold the airbag system is armed. If the arming and deployment criteria are then met, the airbag and pretensioner deploys.

However, the requirement of a minimum of two consecutive deceleration measurements which exceed the deceleration threshold set for a crash must be met. The time interval between two consecutive deceleration measurement points depends on the frequency of the safing sensor. For example, if the safing sensor runs at 100 Hz., the time interval between two consecutive samples is 10 msec. As a minimum of two consecutive points must meet the deceleration threshold value in order to meet the safing condition, the safing condition requirement has a minimum 10 msec delay This delay becomes critical in an airbag deployment since the airbag should be at full deployment and inflation when impacted by the vehicle passenger for maximum passenger safety. If the airbag is not at full deployment when the passenger impacts the airbag, as could result from a delay in initiating the deployment of the airbag, the maximum safety afforded by the airbag to the passenger may not be utilized.

SUMMARY

An airbag deployment control apparatus and method detects conditions predicating deployment of a vehicle airbag which requires two time spaced signals, one indicative of a potential crash condition, and the other detecting an actual crash condition, to safe and arm the airbag system for deployment when the airbag arming and deployment criteria are met.

The apparatus includes an airbag, and an actuator for deploying the airbag. A control is responsive to two separate input signals, one associated with a pre-crash event and one associated with a crash event, to determine criteria for activating the actuator and deploying the airbag. One of the two input signals is the output of a vehicle mounted object collision sensor. The other input signal is a vehicle mounted impact sensor.

The pre-impact sensor may be at least one of a radar, camera and Lidar sensor. Each of the camera, radar and Lidar sensors have an individual electronic control module to assess imminent collision between the vehicle and a detected object.

The vehicle mounted impact sensor may be an impact sensor measuring vehicle deceleration. The control compares a deceleration output from the impact sensor with a deceleration threshold corresponding to an actual collision.

The vehicle mounted impact sensor may be mounted in a forward vehicle facing direction on the vehicle. Optionally, the vehicle mounted impact sensor may be at least one of a forward facing impact sensor, at least one vehicle side facing sensor, and a vehicle rear sensing sensor.

An example
includes providing the pre-impact collision sensor as one of a camera, radar, and Lidar sensor.

The method may further include an electronic control module, associated with each of the camera, radar, and Lidar sensors, for outputting a determination of an imminent collision between the vehicle and an object detected by one of the sensors. The method further includes providing the control as a processer executing stored program instructions.

Utilizing an imminent pre-collision signal as a first airbag safing signal eliminates the time delay involved in the necessity of receiving two collision signals due to the process and frequency of the impact sensor and control safing system. The unique apparatus and method enable the airbag safing criteria to be met as soon as an impact sensor output deceleration value exceeds a preset collision deceleration threshold.

BRIEF DESCRIPTION OF THE DRAWING

The various features, advantages and other uses of the present airbag deployment control apparatus and method will become more apparent by referring to the following description and drawing in which.

DETAILED DESCRIPTION

The present airbag deployment control apparatus and method detects conditions predicating deployment of a vehicle airbag 10, shown in FIG. 2, which require two time spaced signals, indicative of potential and actual crash conditions, to safe and arm the airbag system for deployment when airbag arming and deployment criteria are subsequently met.

The airbag control apparatus and method, hereinafter referred to as the "control" or the "method," detect an imminent crash before an actual crash as a first safing signal and then, for a second safing signal, detect an actual crash resulting in vehicle deceleration above a preset actual crash deceleration threshold. The use of an imminent pre-impact crash signal as the first safing signal eliminates the safing system dependence on the frequency of the safing sensor. This safes the airbag deployment system at an earlier time in the deployment sequence to enable proper timing of the airbag deployment relative to the occupant position during the crash sequence.

A radar, camera or Lidar can be used as a pre-imminent crash sensor to detect an imminent crash situation before an actual crash happens. The airbag ECU 12 can read the message on the vehicle CAN bus that the crash is imminent, and uses it as a first trigger signal. Then, with an impact sensor measuring the actual crash, a second trigger signal can be generated. The benefit is that a significant improvement in minimum bag deployment time can be achieved.

Figure 1:
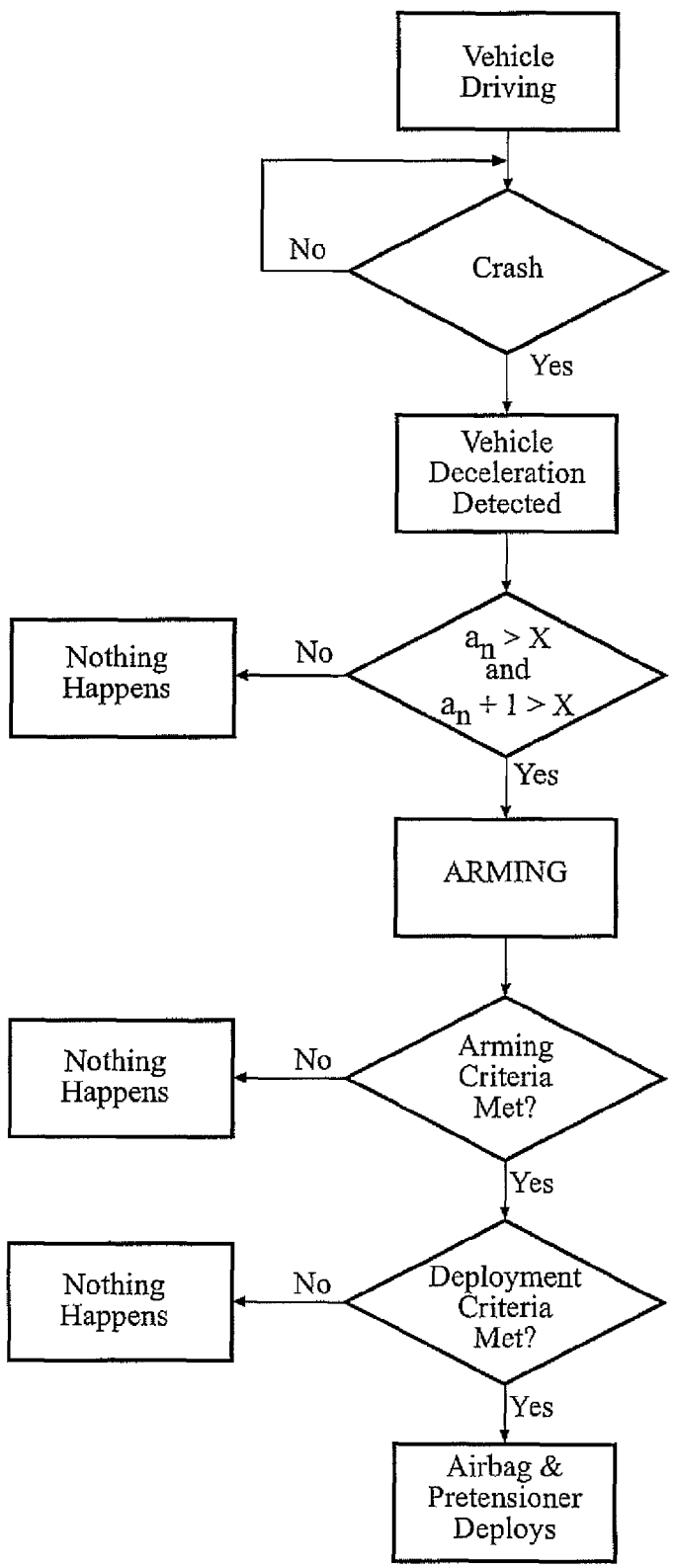
FIG. 1 is a flow chart depicting prior art safing logic for airbag deployment.
Figure 2:
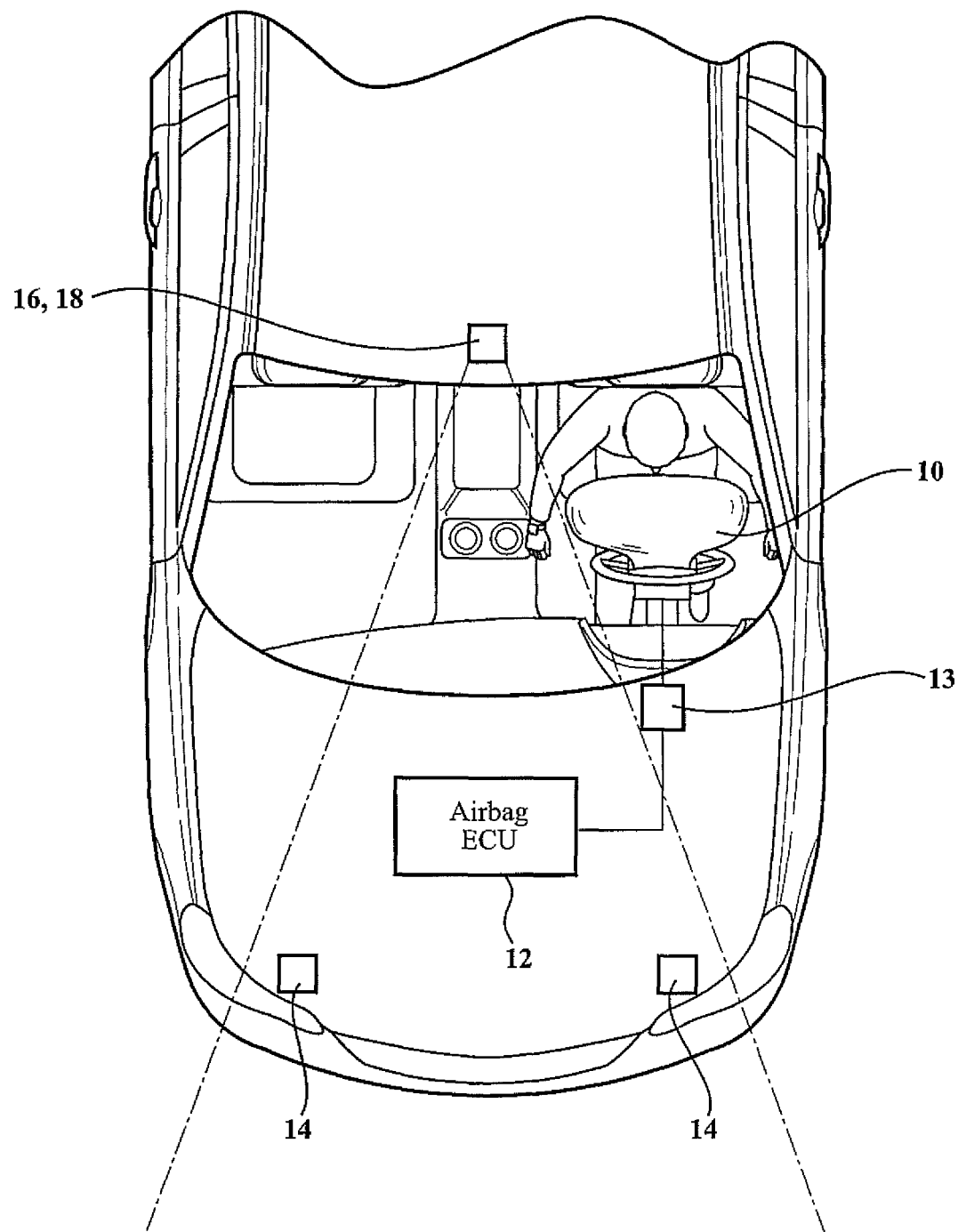
FIG. 2 is a pictorial representation of an airbag deployment control system, using the airbag deployment control method, described hereafter, mounted in a vehicle.
Figure 3:
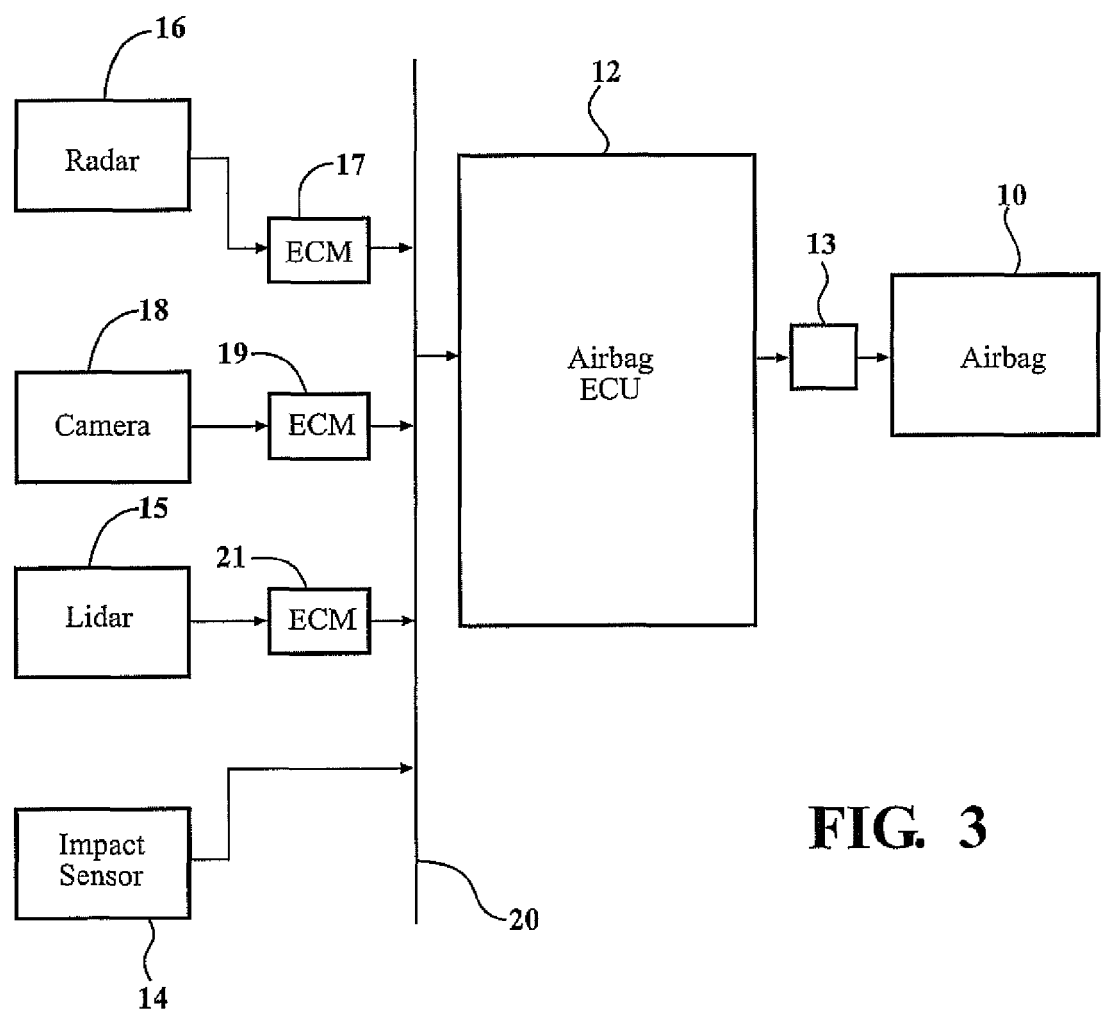
FIG. 3 is a block diagram of the airbag deployment control.

In FIG. 2, an airbag 10 is generically depicted. The airbag 10 can be any or all of the vehicle airbags, i.e., front, side, rear, driver and passenger, etc., which may exist in a vehicle. The airbag 10 is deployed by activating and firing signals from a sensing and diagnostic module or airbag ECU 12. The ECU 12 includes logic to detect two independent trigger signals to make sure that a crash event is taking place before activating the airbag actuator to deploy the airbag 10.

In place of two separate crash sensors, the present apparatus uses the single impact sensor 14 mounted at a suitable location in the vehicle to detect an actual crash event. The first airbag deployment safing or trigger signal is a signal from one or more of a vehicle mounted radar 16 or camera 18 or Lidar 15.

The radar 16 or camera 18 or Lidar 15 will detect objects in the path of the vehicle and logic or control and program instructions in the respective ECM 17, 19, etc., can be implemented as an object sensor to determine that the direction and/or closeness and/or speed of the object and the vehicle are such that a crash is imminent.

Each of the radar 16 camera 18 and Lidar 15 has its own electronic control module (ECM), such as ECM 17 for the radar and ECM 19 for the camera. A Lidar ECM performs the same task for the Lidar sensor 15. The ECMs 17, 19, etc. connect to the vehicle CAN 20 bus as does the airbag ECU 12.

The ECMs 17, 19, etc. take the signals received respectively from the radar 16 or the camera 18, or the Lidar 15 analyze the signals, and compare any detected object in the signals with various conditions, such as a closing speed between the vehicle and the detected object, the speed of the vehicle, etc.

Based on these criteria, the ECM 17, 19, etc., determines whether or not a crash is imminent as a pre-crash event. This crash imminent signal is then sent along the vehicle CAN bus 20 and can be read by the ECU 12.

The ECU 12 uses this crash imminent signal based on the output of the radar 16 or camera 18 or Lidar 15, or a braking signal from the vehicle braking control module, if the braking control module responds to a signal from the radar 16 or the camera 18 or Lidar 15, as one of the two trigger signals required to activate and deploy the airbag 10. Only when the second signal from an impact sensor 14, which actually registers the start of the crash event, is generated will the ECU 12 complete the safing sequence and begin the arming sequence for deployment of the airbag 10.

Figure 4:
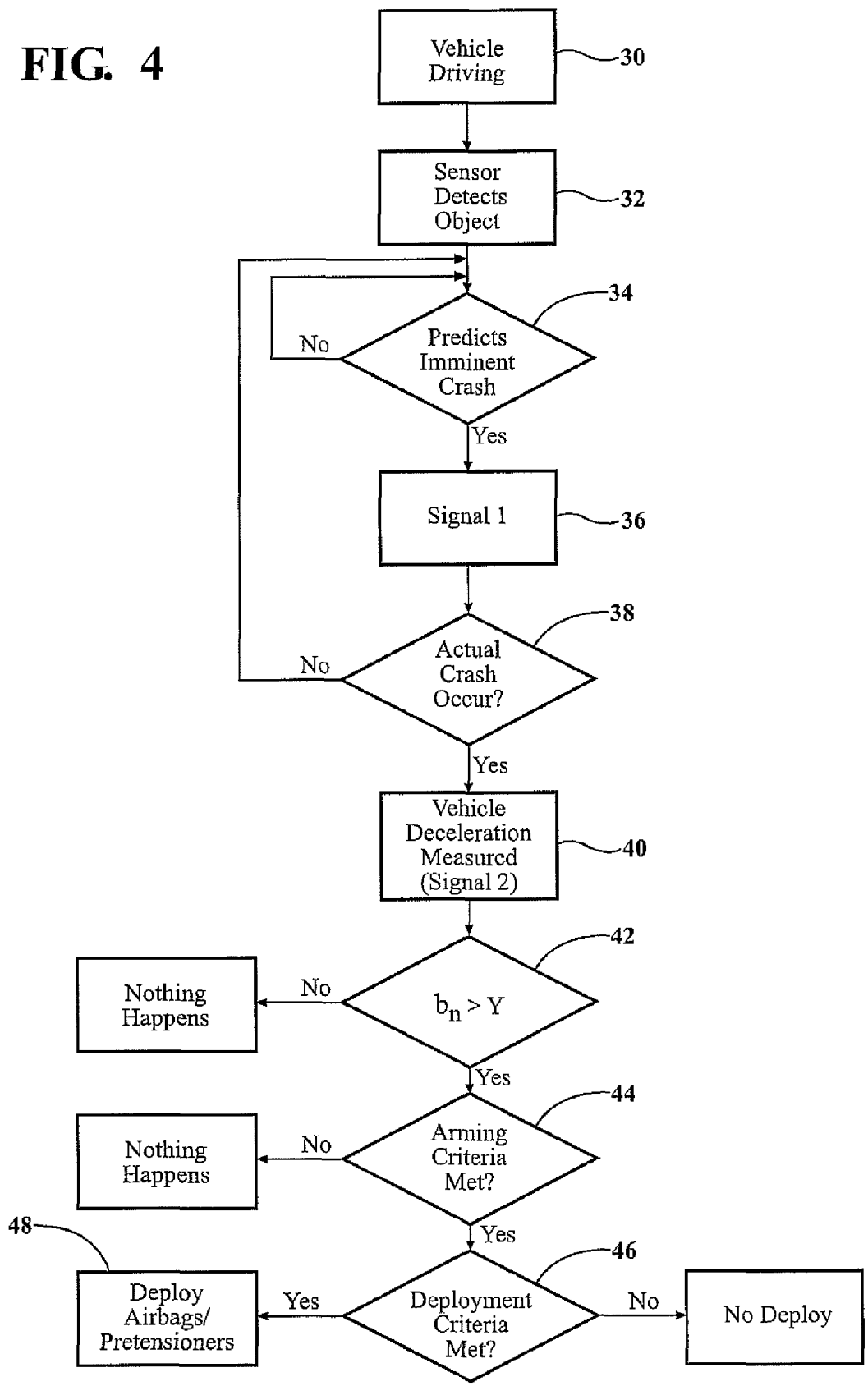
FIG. 4 is a flow diagram depicting the sequence of operation of the apparatus implementing the control and the airbag deployment control method; and, FIG. 5 is a pictorial of the representation of another aspect of an airbag deployment control apparatus and method in a vehicle.

As shown in FIG. 4, when the vehicle is operating and moving on a roadway in step 30, the radar 16 and/or camera 18 and/or Lidar 15 will be active to detect an object in step 32. The ECM 17 or 19, etc. predicts whether a crash is imminent in step 34. If a crash imminent determination is made, the ECU 12 will utilize the crash imminent signal from either the radar ECM 17 or the camera ECM 19 or the Lidar 15 ECM as the first signal of the two signal safing requirement in step 36.

If the vehicle actually crashes, the ECU 12 will receive vehicle deceleration data from the crash sensor 14 in step 38. Each deceleration sample from the crash sensor 14 is compared by the ECM 12 to determine if the sample signal reaches a predetermined deceleration threshold in step 40. When the deceleration threshold is met in step 42, the ECU 12 treats the crash sensor 14 output as the second signal in the safing requirement.

The ECU 12 then determines if the airbag arming criteria is met in step 44. When the arming criterion is met in step 44, the ECU 12 then determines if the airbag deployment criteria is met in step 46. When the deployment criterion is met in step 46, the ECU 12 deploys the airbag 10, as well as other airbags in the vehicle, and the seatbelt pretensioners, if present in the vehicle, in step 48.

The airbag deployment control apparatus and method described above has been depicted in conjunction with the deployment of a vehicle driver airbag 10. It will be understood that the apparatus and method can be used independently to control the deployment of some or all of the airbags in a vehicle, such as passenger front airbags, side curtain airbags, side impact airbags, passenger and driver airbags, etc. The passenger airbag deployment control apparatus and method will depend on the sensing of a passenger in a particular seat to control the deployment of the airbags associated with that particular passenger seat.

Figure 5:
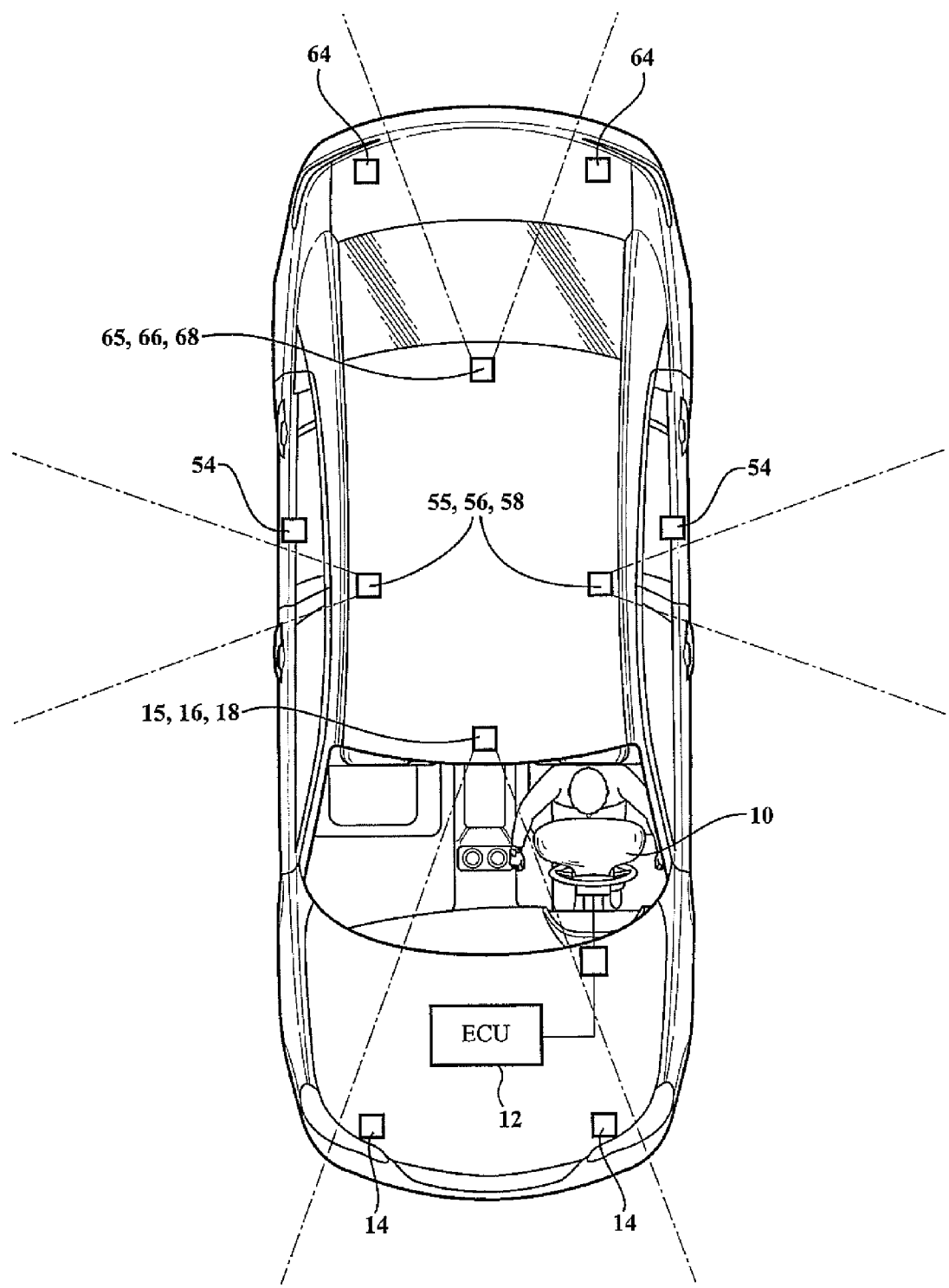

FIG. 5 also depicts the above described airbag deployment control method and apparatus in association with other pre-impact and actual impact sensors on a vehicle. In FIG. 5, the airbag deployment control apparatus and method utilizes vehicle side impact sensors 54 and pre-collision sensors 55, 56, and 58, associated with each vehicle side for detecting imminent side collision and actual side impact collision with the vehicle. The sensors 54 can be the same type of actual impact sensor as the front vehicle sensors 14. Similarly, the imminent collision detection sensors can be the same as the Lidar, radar, or camera sensors 15, 16 and 18. Each of the sensors 55, 56, 58 may have its own electronic control module, not shown in FIG. 5, which communicates with the vehicle ECU 12.

Similarly, one or more rear vehicle impact sensors 64, typically mounted on the rear vehicle bumper, as well as a rear facing object detection sensor, such as a Lidar sensor 65, radar sensor 66, or a camera sensor 68, may be mounted in a rear facing direction on the vehicle, such as on the rear edge of the vehicle roof, or on the vehicle trunk lid, or on a vehicle rear hatch, or on a rear bumper to detect objects to the rear of the vehicle. Each sensor 65, 66 and 68 can be associated with its own ECM, not shown, to determine if the detected object creates an imminent collision potential for the vehicle. The ECM's associated with the pre-collision sensors 65, 66 and 68, as well as the actual crash sensors 64 and outputs are communicated to the vehicle ECU 12.

In this manner, a side impact or a rear impact with the vehicle can control the deployment of all or some of the vehicle airbags in accordance with the method described above using a pre-imminent vehicle collision as a first safety signal.

The airbag deployment control apparatus follows the method shown in FIG. 4 as follows:
- detecting by a vehicle mounted pre-impact sensor and by an electronic module on the vehicle, a pre-impact collision event involving the vehicle;
- detecting, by a vehicle mounted impact sensor, a vehicle deceleration exceeding a threshold deceleration indicative of an actual vehicle crash;
- detecting by an electronic control unit on the vehicle, two consecutive airbag safing events, where the two consecutive safing events include a first event being the determination of a pre-impact collision event, and the second event being the output from the impact sensor of an actual vehicle crash; and
- deploying, by the electronic control unit, a vehicle airbag in response to the detection of the two consecutive safing event and when the airbag system arming and deployment criteria are met.

As a safing system requires a minimum of two consequent data points to ensure that there is an actual crash, it takes a certain amount of time to deploy the airbags. Instead of using two data points measured by the safing sensor, the new airbag deployment control apparatus and method uses one signal from an active safety system such, as radar and/or camera and/or Lidar before a crash, and one from the impact sensor indicative of an actual crash as the two safing system criteria.

This minimizes the effect of safing sensor frequency between the two signals as the first signal is detected prior to the occurrence of an actual crash.

What is claimed is:

1. An airbag deployment control apparatus comprising:
an airbag mounted to a vehicle;
a pre-impact sensor mounted to the vehicle configured to detect an imminent impact of a detected object positioned exterior of the vehicle and generate a first safing signal;
an impact sensor mounted to the vehicle, the impact sensor configured to measure deceleration of the vehicle and to generate a second safing signal independent of the first safing signal; and
a control unit in communication with the pre-impact sensor, the impact sensor and the airbag, the control unit having a safing requirement requiring receipt of the first safing signal generated by the pre-impact sensor and the second safing signal generated by the impact sensor in order for the airbag to be deployed.

2. The apparatus of claim 1 wherein pre-impact sensor comprises one of a radar, camera, or Lidar sensor.

3. The apparatus of claim 2 further comprising:
a pre-impact sensor electronic control unit in communication with the pre-impact sensor to assess the imminent impact between the vehicle and the detected object.

4. The apparatus of claim 1 wherein:
the vehicle mounted pre-impact sensor is mounted on at least one of the vehicle forward, rearward, left side or right side facing direction; and
the vehicle impact sensor is mounted on at least one of the vehicle forward, rearward, left side or right side facing direction.

5. The apparatus of claim 1 further comprising:
an autonomous emergency braking device (AEB) in communication with the pre-impact sensor, the AEB configured to send a crash imminent signal to the control unit to satisfy the first safing signal requirement on receipt of a pre-imminent impact signal from the pre-impact sensor.

6. The apparatus of claim 1 wherein the control unit further comprises a predetermined vehicle deceleration threshold value stored in a memory device, wherein on the control unit receipt of the pre-impact first safing signal and a first in time of the second safing signal having a value greater than the predetermined deceleration threshold value, the required first and the second safing signals are satisfied.

7. The apparatus of claim 6 wherein the pre-impact first safing signal is generated at a first time and the first in time impact second safing signal having a value greater than the predetermined deceleration threshold value is generated at a second time, the second time occurring after the first time defining a safing requirement time delay.

8. The apparatus of claim 7 wherein the safing requirement time delay is less than 10 milliseconds (msec).

9. The apparatus of claim 1 further comprising an airbag actuator mounted to the vehicle in communication with the control unit and the airbag, wherein on satisfaction of the first and the second safing signals, the control unit signals the actuator to deploy the airbag.

10. A method for deploying an airbag, the method comprising the steps of:
generating a vehicle pre-impact input signal by a pre-impact sensor to a control unit;
generating a vehicle impact signal by an impact sensor to the control unit following generation of the pre-impact input signal;
determining if the vehicle impact signal is greater in value than a predetermined vehicle deceleration threshold value;
using the pre-impact input signal as a first safing signal; and
using a first in time of the vehicle impact signal greater in value than the predetermined vehicle deceleration threshold value as a second safing signal required to deploy the airbag.

11. The method of claim 10 wherein the step of generating a vehicle pre-impact input signal comprises one of:
detecting an imminent pre-impact of a vehicle with an object positioned exterior of the vehicle by the pre-impact sensor in communication with the control unit; or
receiving a signal from an autonomous emergency braking (AEB) device positioned in the vehicle in communication with the control unit.

12. The method of claim 11 wherein detecting the imminent pre-impact of the vehicle with the object further comprises:
mounting to the vehicle in an operative direction away from the vehicle, and placing in communication with the control unit, one of a camera, radar or Lidar; and obtaining imminent pre-impact sensor data from the one of the camera, radar or Lidar.

13. The method of claim 12 wherein the step of detecting the imminent pre-impact of the vehicle with the object further comprises the step of assessing whether the obtained imminent pre-impact sensor data is indicative of an imminent impact of the vehicle with the object through a pre-impact sensor electronic control module in communication with the pre-impact sensor.

14. The method of claim 12 further comprising the steps of:
   sending the obtained imminent pre-impact sensor data to the AEB device;
   determining to engage the AEB device to decelerate the vehicle in a braking control module; and
   sending a braking signal to the control unit serving as the first safing signal.

15. The method of claim 10 wherein the generating the vehicle impact signal further comprises the step of:
   measuring deceleration of the vehicle through the impact sensor.

16. The method of claim 15 further comprising the step of:
   comparing the measured vehicle deceleration to the predetermined vehicle deceleration threshold value stored in the control unit.

17. The method of claim 10 wherein following receipt of the first safing signal and the second safing signal the method further comprises:
   determining whether airbag arming criteria has been met; and
   determining whether airbag deployment criteria has been met.

* * * * *